(12) United States Patent
Buth et al.

(10) Patent No.: US 9,435,626 B2
(45) Date of Patent: Sep. 6, 2016

(54) KINEMATIC FIXTURE FOR TRANSPARENT PART METROLOGY

(75) Inventors: Wesley J Buth, Corning, NY (US); Ying Li, Painted Post, NY (US); Paul F Novak, Corning, NY (US); Rashid Abdul-Rahman, Horseheads, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 481 days.

(21) Appl. No.: 13/208,798

(22) Filed: Aug. 12, 2011

(65) Prior Publication Data

US 2013/0037679 A1    Feb. 14, 2013

(51) Int. Cl.
| | | |
|---|---|---|
| G02B 7/00 | (2006.01) | |
| G01B 5/00 | (2006.01) | |
| G02B 7/02 | (2006.01) | |
| G01M 11/02 | (2006.01) | |
| F16M 11/04 | (2006.01) | |

(52) U.S. Cl.
CPC ........... *G01B 5/0004* (2013.01); *G01B 5/0002* (2013.01); *G01M 11/0214* (2013.01); *G02B 7/004* (2013.01); *G02B 7/023* (2013.01); *G02B 7/026* (2013.01); *F16M 11/04* (2013.01); *F16M 11/046* (2013.01); *Y10S 269/90* (2013.01); *Y10S 269/909* (2013.01)

(58) Field of Classification Search
CPC .................................................. G01B 5/0004
USPC .............. 248/346.04, 346.06, 581; 356/244; 359/822, 823
See application file for complete search history.

(56) References Cited

U.S. PATENT DOCUMENTS

| | | | | |
|---|---|---|---|---|
| 1,104,891 A | * | 7/1914 | Heusser | 248/346.05 |
| 2,270,158 A | * | 1/1942 | Baesgen | G01B 3/14 29/406 |
| 3,402,613 A | * | 9/1968 | Neusel et al. | 74/89.35 |
| 3,478,608 A | * | 11/1969 | Met | 74/89.23 |
| 3,569,718 A | * | 3/1971 | Borner | 250/548 |
| 3,897,139 A | | 7/1975 | Caruolo et al. | |
| 4,522,365 A | * | 6/1985 | Tabares | 248/466 |
| 4,583,847 A | * | 4/1986 | Battig | G01B 5/0004 355/53 |
| 4,609,285 A | * | 9/1986 | Samuels | 355/75 |
| 5,026,033 A | * | 6/1991 | Roxy | B23Q 3/103 269/309 |
| 5,798,879 A | * | 8/1998 | Salvio | 359/857 |
| 5,836,575 A | * | 11/1998 | Robinson et al. | 269/317 |
| 5,880,894 A | * | 3/1999 | Blakley | 359/819 |
| 6,035,522 A | * | 3/2000 | Larson et al. | 29/760 |
| 6,040,096 A | * | 3/2000 | Kakizaki | G03F 7/70358 355/53 |
| 6,072,569 A | | 6/2000 | Bowen | |

(Continued)

FOREIGN PATENT DOCUMENTS

| | | |
|---|---|---|
| GB | 2239894 A | 7/1991 |
| WO | 03/006971 | 1/2003 |

OTHER PUBLICATIONS

PCT/US20123/047287 Search Report.

*Primary Examiner* — Jonathan Liu
*Assistant Examiner* — Chiedu Chibogu
(74) *Attorney, Agent, or Firm* — John T. Haran

(57) ABSTRACT

A fixture apparatus for positioning an optical component has a transparent base. An adjustment plate that is formed from a transparent material is kinematically coupled to the base. Support posts extend from the adjustment plate for seating the optical component. A number of alignment elements extend from the transparent base for aligning one or more edges of the optical component seated on the support posts.

17 Claims, 5 Drawing Sheets

(56) References Cited

U.S. PATENT DOCUMENTS

| | | | |
|---|---|---|---|
| 6,111,706 A * | 8/2000 | Incera et al. ................... 359/822 |
| 6,331,095 B1 * | 12/2001 | Hiroki ............... H01L 21/68742 |
| | | | 414/222.01 |
| 6,386,719 B1 * | 5/2002 | Lee ............................... 359/879 |
| 6,441,899 B1 * | 8/2002 | Blaesing-Bangert | |
| | | et al. ........................... 356/244 |
| 6,473,247 B1 * | 10/2002 | Keller et al. ................... 359/819 |
| 6,663,247 B1 * | 12/2003 | Uno et al. ..................... 359/874 |
| 6,676,761 B2 * | 1/2004 | Shang et al. .................. 118/728 |
| 6,771,437 B1 | 8/2004 | Willis | |
| 6,856,437 B2 * | 2/2005 | Witt et al. .................. 359/200.7 |
| 7,081,963 B2 * | 7/2006 | Blaesing-Bangert | |
| | | et al. ........................... 356/630 |
| 7,204,887 B2 * | 4/2007 | Kawamura et al. ........... 118/725 |
| 7,352,520 B2 | 4/2008 | Makino et al. | |
| 7,665,951 B2 * | 2/2010 | Kurita ................... C23C 14/566 |
| | | | 414/217 |
| 7,984,679 B1 * | 7/2011 | McFee .......................... 108/106 |
| 8,783,066 B2 * | 7/2014 | Bailey ................. C03B 23/0235 |
| | | | 65/104 |
| 2001/0021446 A1 * | 9/2001 | Takematsu ............. G02B 1/113 |
| | | | 428/220 |
| 2002/0154839 A1 | 10/2002 | Trost | |
| 2004/0074176 A1 * | 4/2004 | Baker ................. A47B 87/0207 |
| | | | 52/263 |
| 2005/0184205 A1 * | 8/2005 | Fang ........................ F16M 7/00 |
| | | | 248/188.2 |
| 2006/0170814 A1 * | 8/2006 | Tsai ....................... G02B 7/023 |
| | | | 348/357 |
| 2008/0225255 A1 | 9/2008 | Margeson et al. | |
| 2009/0273825 A1 * | 11/2009 | Ichikawa et al. .............. 359/292 |
| 2010/0229602 A1 * | 9/2010 | Ross ................... C03B 23/0252 |
| | | | 65/107 |
| 2011/0102919 A1 * | 5/2011 | Song ............................. 359/822 |
| 2013/0120720 A1 * | 5/2013 | Hellin .................... G02B 7/021 |
| | | | 353/101 |

* cited by examiner

KINEMATIC FIXTURE FOR TRANSPARENT PART METROLOGY

FIELD OF THE INVENTION

This invention generally relates to optical apparatus for fixturing in optical metrology applications and more particularly relates to a kinematic fixture apparatus for supporting thin transparent surfaces of variable shapes and curvatures.

BACKGROUND

Techniques for fixturing and measuring optical components that have substantially flat or planar surfaces are well known to those skilled in the optical metrology arts. However, many of the same fixturing techniques used for metrology with flat components can be unsuitable for mounting and measurement of thinner parts that have non-planar surfaces. Thin glass parts, for example, such as those designed for use in hand-held electronic devices and other apparatus, are often molded or otherwise shaped to have non-planar, three-dimensional shapes that are better suited to the contour of the device than are flat shapes. Tolerances for such parts can be demanding, depending upon the particular application. It can be difficult to properly position a curved part in a fixture for optical testing and measurement, without causing some measure of overconstraint that can distort the measured part and thus compromise any measurements made or can even potentially damage the component.

Problems with component fixturing can be compounded with the use of automated testing systems. There can be little tolerance for error in proper positioning of the curved part within the fixture for measurement or for inadvertent movement of the part during translation of the fixture itself. Further, conventional fixtures are formed from metal or other stiff material that is opaque, limiting the light source options for the metrology system.

Repeatability of placement, so that the part being measured seats in only one position within the fixture, is particularly useful for providing smooth, efficient workflow in parts metrology. Achieving repeatability for positioning of thin, non-planar components can be particularly challenging, particularly where there is minimal tolerance for positioning errors.

In parts fixturing for metrology, it is generally necessary to constrain movement of the part from translation along any of the orthogonal x, y, and z axes as well as from rotation about any axis ($\theta x$ or "pitch", $\theta y$ or "roll", $\theta z$ or "yaw"). Conventional clamp or vacuum holding techniques may hold the part in position, but are characterized by overconstraint and present the risk of distorting the measured part in some way, leading to inaccurate measurement. Overconstraint problems in fixturing can be further compounded by thermal conditions.

Thus, it can be seen that there is a need for a method and apparatus for improved optical component fixturing, particularly for parts that exhibit some degree of curvature.

SUMMARY

It is an object of the present invention to advance the art of fixturing for optical component metrology. With this object in mind, the present invention provides a fixture apparatus for positioning an optical component, the apparatus comprising:

a transparent base;

an adjustment plate that is formed from a transparent material and is kinematically coupled to the base;

a plurality of support posts that extend from the adjustment plate for seating the optical component;

and a plurality of alignment elements that extend from the transparent base for aligning one or more edges of the optical component seated on the support posts.

A feature of the present invention is the use of kinematic design to help mechanically isolate structures that support the optical component from the mounting base of the fixture.

An advantage of the present invention is the capability to support positioning of thin optical components having a curved profile using kinematic constraint techniques.

Another advantage of the present invention is its capability for repeatability in parts placement, providing as few as six contact points, three for support of the curved surface and three for registering edges of the part. The apparatus of the present invention also has particular advantages for metrology of transparent parts, allowing light to be directed to the part through the fixture itself.

Other desirable objectives, features, and advantages of the disclosed invention may occur or become apparent to those skilled in the art. The invention is defined by the appended claims.

DETAILED DESCRIPTION

Figures shown and described herein are provided in order to illustrate key principles of operation and fabrication for an optical apparatus according to various embodiments and a number of these figures are not drawn with intent to show actual size or scale. Some exaggeration may be necessary in order to emphasize basic structural relationships or principles of operation. For example, some coplanar structures may be shown slightly offset from each other in views where these structures overlap.

Where they are used in the present disclosure, the terms "first", "second", and so on, do not necessarily denote any ordinal or priority relation, but are used for more clearly distinguishing one element or time interval from another. There are not fixed "first" or "second" elements in what is taught herein; these descriptors are merely used to clearly distinguish one element from another similar element in the context of the present disclosure, such as in the order in which like parts are referenced.

In the context of the present disclosure, the term "transparent" means transmissive to visible light at least over a range from about 400 to about 750 nm, preferably over a broader range that includes additional portions of the ultraviolet (UV) or infrared (IR) spectrum. Transmissive means exhibiting transmission of at least about 70% of light incident over the range; more preferably, transmission exceeds 90% of incident light.

In the context of the present disclosure, the term "kinematic coupling" relates to the type of coupling method that is used for one or more components. Conventional mechanical coupling methods can alternately be used for apparatus assembly. In the context of the present disclosure, the term "single-point contact" has its conventional meaning as would be clear to one skilled in the mechanical arts.

In the context of the present disclosure, a curved surface is considered to be a surface that has a radius of curvature that is less than about 10 meters. A planar surface has a radius in excess of about 10 meters. Embodiments of the present invention provide apparatus and methods for fixturing an optical component having either a planar or curved surface, including curved surfaces having a radius of curvature that is well within 100 cm, for example.

Figure 1:
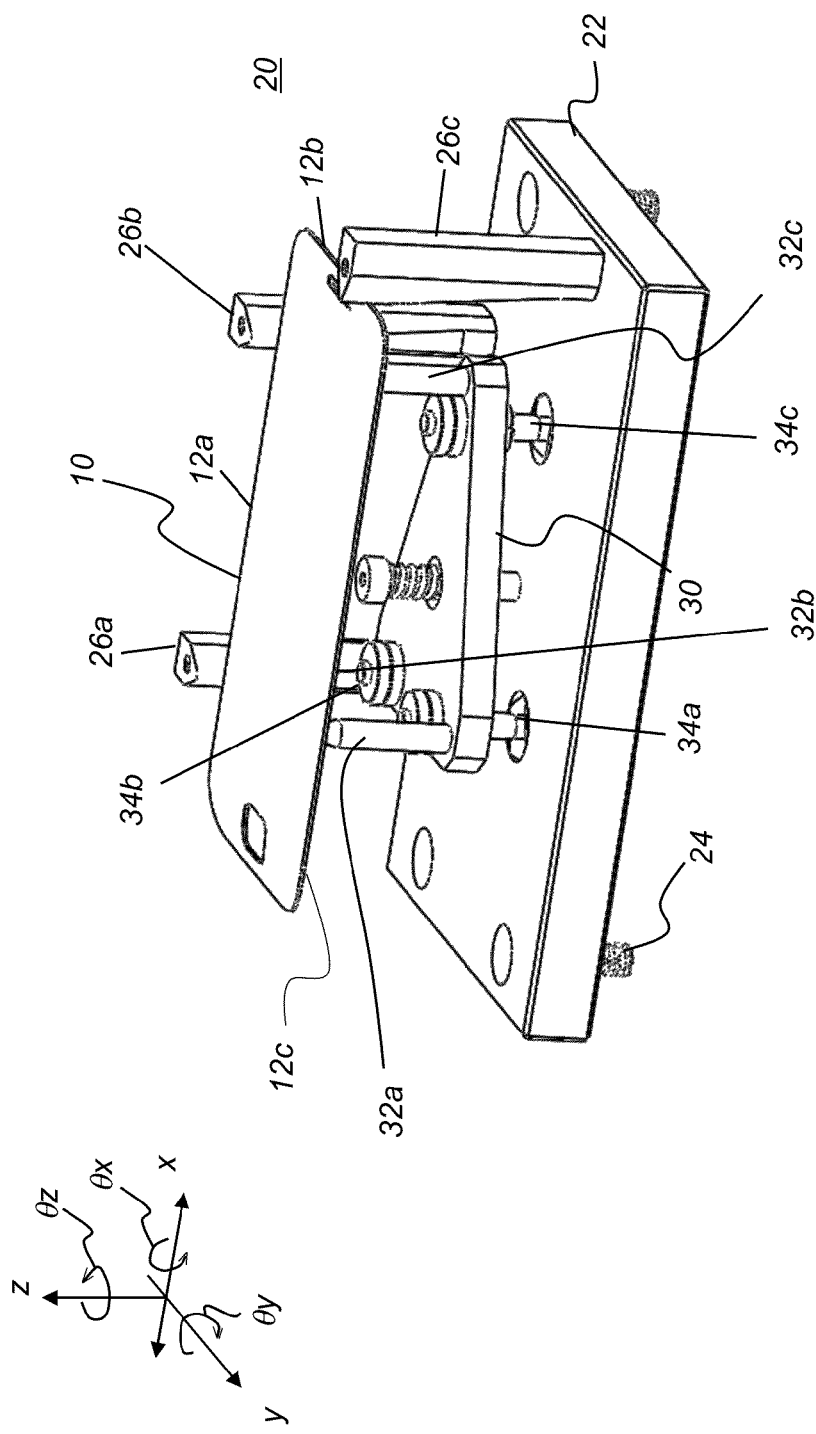
FIG. 1 is a perspective view of a fixture apparatus according to an embodiment of the present invention.

Apparatus and methods of embodiments of the present invention help to provide fixturing for optical components that may have a range of possible shapes and curvatures. By way of example, the perspective view of FIG. 1 shows a transparent optical component 10, represented as a thin, slightly curved glass plate, seated within a fixture apparatus 20 according to an embodiment of the present invention. Fixture apparatus 20 has a base 22 that is transparent and that is featured for mounting within an optical metrology system (not shown), such as using mounting bolts 24. An adjustment plate 30, also formed from a transparent material, is kinematically coupled to base 22, providing support posts 32a, 32b, and 32c that seat optical component 10. Alignment elements 26a, 26b, and 26c extend from transparent base 22 to align edges 12a and 12b of optical component 10 once it is seated in fixture apparatus 20.

As can be seen from the perspective view of FIG. 1, components coupled to and supported from base 22 present a pattern of constraints for each of the six degrees of freedom (DOF), as shown by the orthogonal axes in FIG. 1. With this constraint pattern, optical component 10 can be positioned accurately and repeatably in fixture apparatus 20 and can be maintained in its proper position without the need for a clamp or vacuum or other overconstraining device or force.

Figure 2:
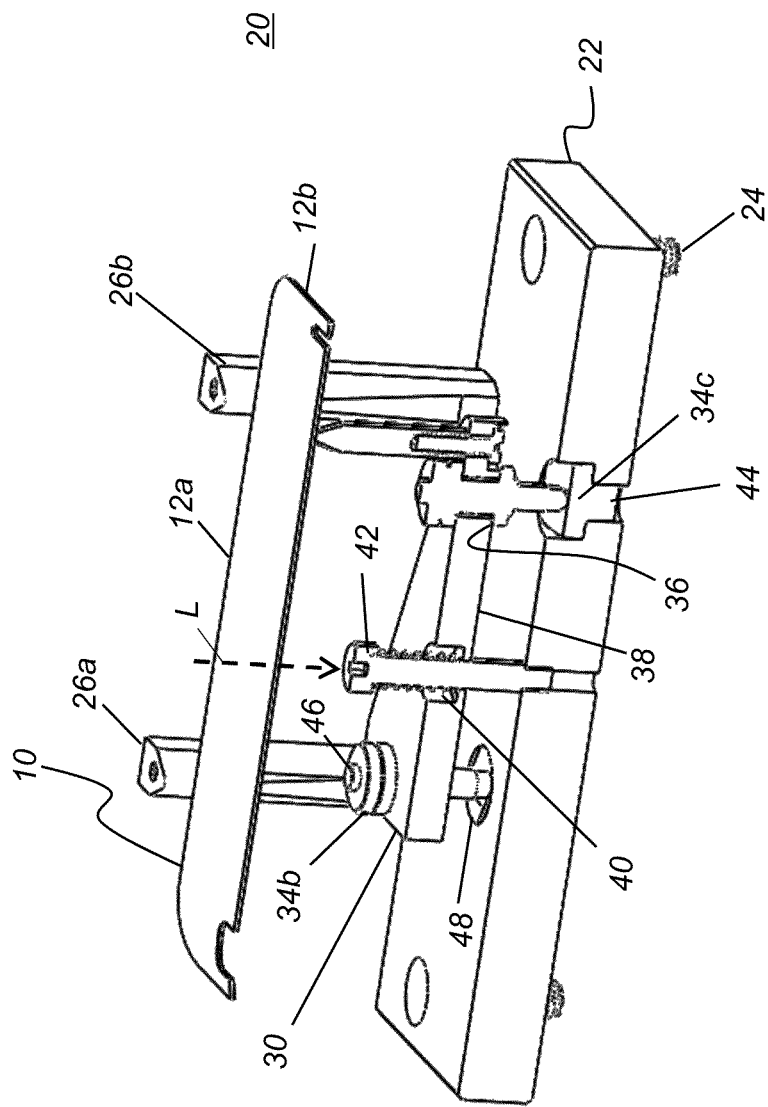
FIG. 2 is a cross-sectional view, in perspective of the fixture apparatus.

The perspective view of FIG. 1 and cross-sectional view of FIG. 2 show details of the kinematic mounting that is provided for adjustment plate 30 and that allows plate 30 to be tilted to an appropriate angle for the contour of the optical component 10 that is to be measured. Adjustment plate 30 is approximately triangular in the embodiment shown, but could have any other suitable shape. Three adjustable supporting elements 34a, 34b, 34c are provided for obtaining the needed angle for adjustment plate 30. Because three points in space define a plane, the height of each supporting element 34a, 34b, and 34c defines the corresponding inclination of the plane that is parallel to surfaces of adjustment plate 30.

Each of the three edge alignment elements 26a, 26b, and 26c provides a single-point contact along a corresponding edge of optical component 10.

As FIG. 2 shows more clearly, a loading element such as a compression spring 40 on a shoulder screw 42 provides a loading force L that forces a lower surface 38 of adjustment plate 30 against a shelf 36 in each of adjustable supporting elements 34a, 34b, and 34c (element 34c shown sectioned in FIG. 2). Loading force L from spring 40 or other type of loading element is chosen to be sufficient for providing a loading force to adjustable supporting elements 34a, 34b, and 34c without causing perceptible distortion to adjustment plate 30.

Figure 3:
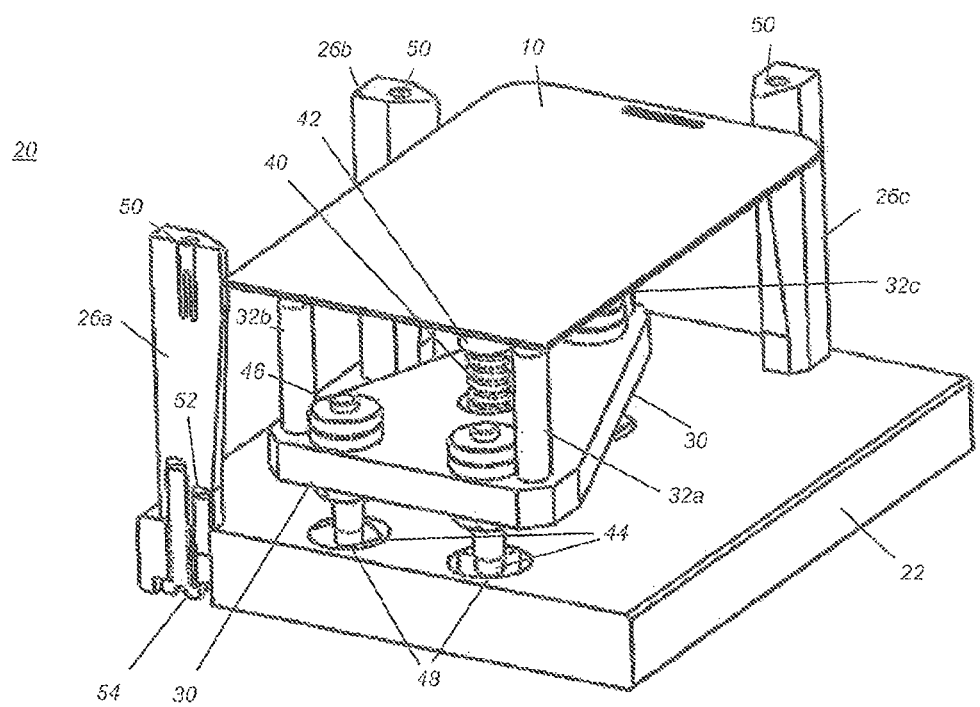
FIG. 3 is a cross-sectional view, in perspective of the fixture apparatus, from a different angle.
Figure 4:
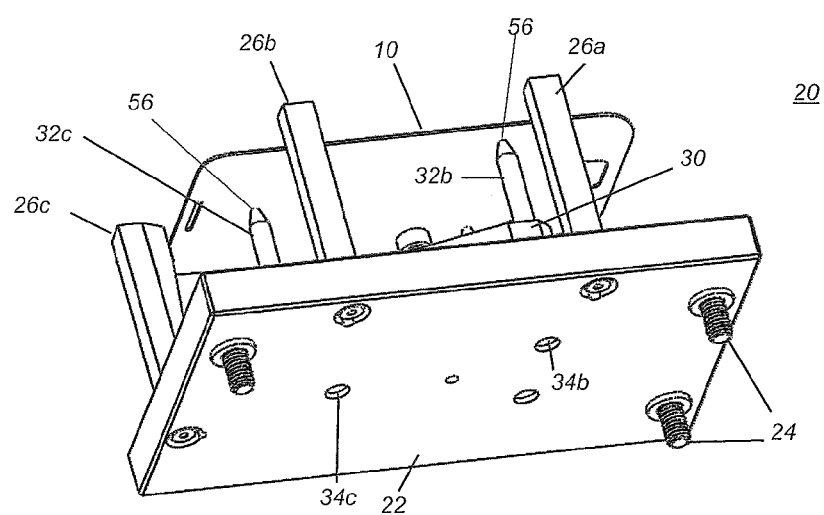
FIG. 4 is a perspective view, from the bottom, of the fixture apparatus.

As FIGS. 2, 3, and 4 show, each of adjustable supporting elements 34a, 34b, and 34c terminates in a rounded shaft that forms a ball end 44. Each ball end 44 seats in a v-shaped groove or v-groove 48 as a kinematic coupling. Consistent with an embodiment of the present invention, the intersection lines at the bottom of each v-groove 48, when extended, intersect at or near the central axis of shoulder screw 42.

Support posts 32a, 32b, and 32c provide three-point contact against the surface of the optical component 10 that is to be measured. Consistent with one embodiment of the present invention, support posts 32a, 32b, and 32c are of the same length, but can be of different lengths in an alternate embodiment. At each adjustable supporting element 34a, 34b, and 34c, an actuator 46 is provided for making the corresponding height adjustment. Actuators 46 can be micrometer-type actuators, allowing fine axial motion response to the adjustment setting or any other suitable type of actuator for making a vertical adjustment.

Figure 5:
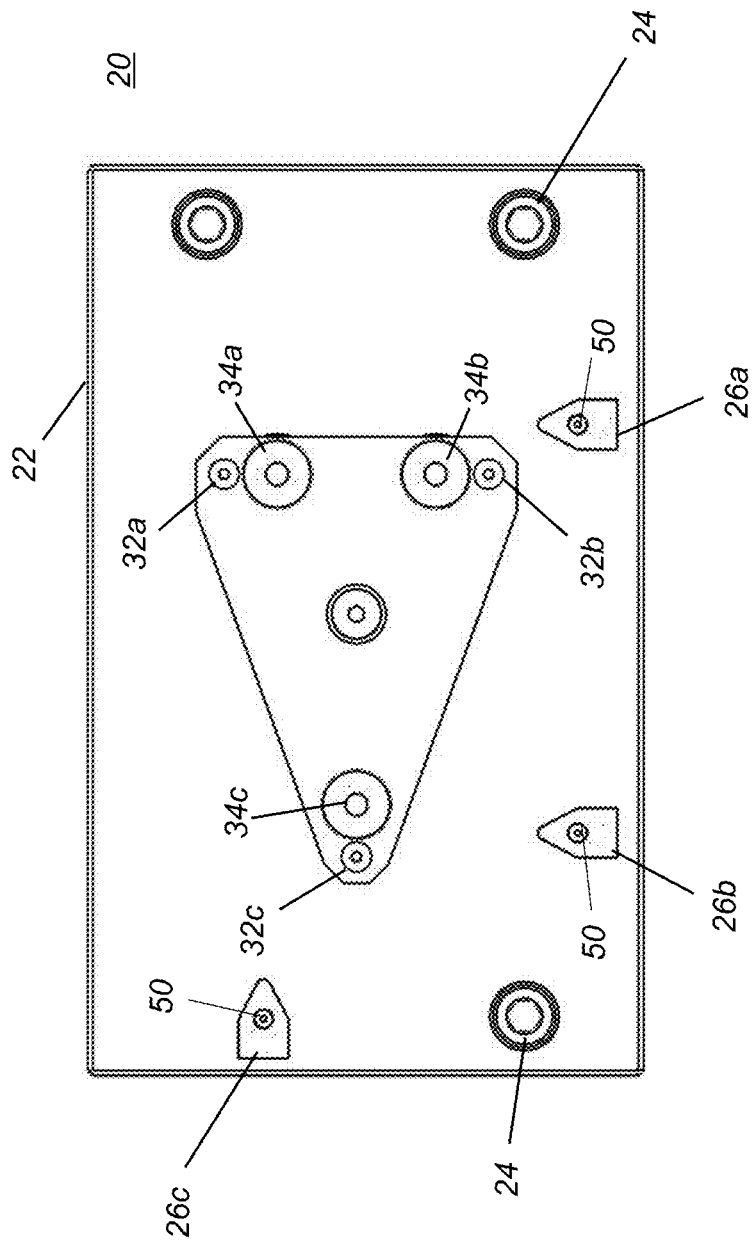
FIG. 5 is a top view of the fixture apparatus, without the mounted optical component.

As is shown most clearly in FIGS. 3 and 5, each of the edge alignment elements 26a, 26b, and 26c provides single-point contact that helps to position optical component 10 repeatably, without ambiguity. In addition, in combination with support posts 32a, 32b, and 32c, alignment elements 26a, 26b, and 26c help to prevent any shift or movement of optical component 10 during handling or transport within the test fixture. To approximate ideal point contact that minimizes parasitic constraint forces, sides of alignment elements 26a, 26b, and 26c are angled in horizontal cross-section, featured to provide contact against edges 12a and 12b over a very small area. As shown in FIGS. 3 and 5, each of alignment elements 26a, 26b, and 26c is further featured with an optional target 50 that is used as a positional reference by the optical metrology apparatus.

Fixture apparatus 20 has a number of features that help for fixturing optical components having curved surfaces. As is shown in the cross section of alignment element 26a in FIG. 3, an optional dowel pin 52 and a screw 54 are used to lock the edge alignment elements more rigidly into position relative to base 22.

Advantageously, fixture apparatus 20 employs gravity for supporting optical component 10. The top surfaces 56 of one or more support posts 32a, 32b, and 32c may be rounded, flattened, roughened, coated, or otherwise treated in order to provide a desired amount of friction at the contact interface with the supported surface of optical component 10.

Adjustments to adjustment plate 30 enable settings such as tip, tilt, and elevation to be set up so that these settings are suitable for the shape of the parts to be measured. Once adjusted for a particular part, fixture apparatus 20 can be used repeatedly to provide precision positioning. An interferometric laser that is used with the optical measuring instrument (not shown) can be used to check the vertical location of each of support posts 32a, 32b, and 32c, and to help determine whether or not the setting is level or tilted relative to an axis.

Transparency of base 22 and of adjustment plate 30 enable light to be directed toward optical component 10 from below during the measurement process. This can be advantageous for measuring the overall shape of the part, for example, or for measuring translucency or other characteristics of the optical component 10. Coatings of various types could alternately be applied to the surfaces of base 22 and adjustment plate 30, such as anti-reflection (AR) coatings, for example.

Fixture apparatus 20 can be formed from suitable materials of any of a number of types. Base 22 and adjustment plate 30 can be glass, such as a machinable glass, or polycarbonate, or other suitable natural or synthetic material having the necessary transparency characteristics. Using very small surface-contact areas on adjustment plate 30 helps to further isolate plate 30 from base 22 where heat may be a factor.

The loading force denoted L in FIG. 2 can be provided by a spring 40 as shown or could be provided using a flexure or some other loading element or force.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. The invention is defined by the claims.

Thus, what is provided is a fixture apparatus for positioning an optical component.

The invention claimed is:

1. A fixture apparatus for positioning an optical component, the apparatus comprising:
   a transparent base having opposing top and bottom surfaces;
   an adjustment plate, having opposing top and bottom surfaces, that is formed from a transparent material and is kinematically coupled to the base such that the bottom surface of the adjustment plate faces the top surface of the base;
   a plurality of support posts that extend from the top surface of the adjustment plate for seating the optical component;
   a plurality of alignment elements that extend from the top surface of the transparent base for aligning one or more edges of the optical component by contacting the optical component seated on the support posts; and
   a spring that directs a loading force against the adjustment plate.

2. The fixture apparatus of claim 1 wherein the adjustment plate is kinematically coupled to the base using first, second, and third adjustable supporting elements that extend from the base.

3. The fixture apparatus of claim 2 wherein at least one of the adjustable supporting elements has an actuator.

4. The fixture apparatus of claim 1 wherein the adjustment plate is kinematically coupled to the base by a plurality of adjustable supporting elements that extend from the base and wherein each of the plurality of adjustable supporting elements terminates at a rounded feature that seats against a corresponding v-groove formed in the transparent base.

5. The fixture apparatus of claim 1 wherein the adjustment plate is formed from a polycarbonate plastic material.

6. The fixture apparatus of claim 1 wherein at least one of the adjustment plate and base are glass.

7. The fixture apparatus of claim 1 wherein the plurality of support posts provide three-point contact for seating the optical component.

8. The fixture apparatus of claim 1 wherein each alignment element in the plurality of alignment elements provides single-point contact for an edge of the optical component.

9. A fixture apparatus for positioning an optical component, the apparatus comprising:
   a transparent base having opposing top and bottom surfaces;
   an adjustment plate, having opposing top and bottom surfaces, that is formed from a transparent material and is kinematically coupled to the base by first, second, and third adjustable supporting elements that extend from the base such that the bottom surface of the adjustment plate faces the top surface of the base;
   first, second, and third support posts that extend from the top surface of the adjustment plate for seating the optical component;
   first, second, and third edge alignment elements that extend from the top surface of the transparent base for aligning one or more edges of the optical component by contacting the optical component; and
   a spring that directs a loading force against the adjustment plate.

10. The fixture apparatus of claim 9 wherein at least one of the adjustable supporting elements terminates at a rounded feature that seats against a corresponding v-groove formed in the transparent base.

11. The fixture apparatus of claim 9 wherein the adjustment plate is formed from a polycarbonate plastic material.

12. The fixture apparatus of claim 9 wherein at least one of the first, second, and third edge alignment elements further comprises a target used by a testing apparatus.

13. A method for positioning an optical component using the comprising: providing the fixture apparatus of claim 1; seating plurality of alignment elements; and
   coupling the transparent adjustment plate kinematically to the transparent base by providing a loading force that forces the adjustment plate against a plurality of adjustable supporting elements that extend from the base, wherein the loading force is provided via the spring.

14. The method of claim 13 wherein the plurality of supporting elements comprise at least first, second, and third adjustable supporting elements that extend from the base.

15. The method of claim 13 wherein the plurality of supporting elements are adjustable to tilt the adjustment plate relative to the base.

16. The fixture apparatus of claim 1 wherein the plurality of support posts extend from the top surface of the adjustment plate in a perpendicular orientation.

17. The fixture apparatus of claim 1 wherein the plurality of alignment elements directly contact the optical component seated on the support posts.

* * * * *